L. BRAUER,
Assignor of one-half interest to C. SAAKE.
Extension Chandelier.
No. 9,024. Reissued Jan. 6, 1880.
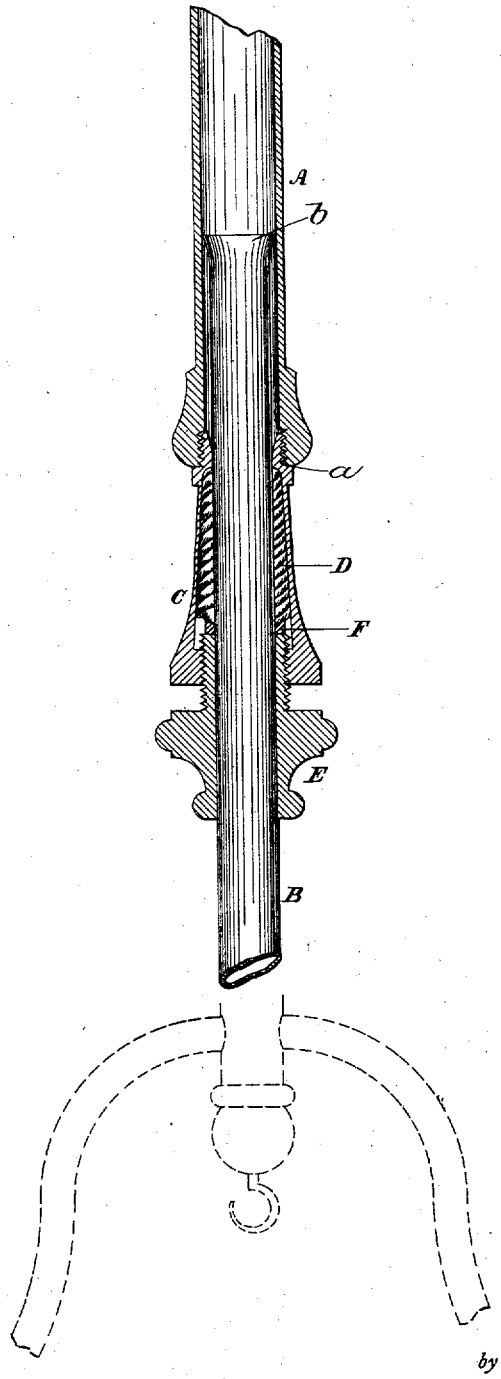
Witnesses:
A. P. Grant,
W. F. Kircher
Inventor:
Louis Brauer,
by John A. Wiedersheim,
ATTORNEY.
N. PETERS, PHOTO-LITHOGRAPHER, WASHINGTON, D. C.

UNITED STATES PATENT OFFICE.

LOUIS BRAUER, OF PHILADELPHIA, PENNSYLVANIA, ASSIGNOR OF ONE-HALF INTEREST TO CARL SAAKE.

EXTENSION-CHANDELIER.

SPECIFICATION forming part of Reissued Letters Patent No. 9,024, dated January 6, 1880.

Original No. 219,682, dated September 16, 1879. Application for Reissue filed December 9, 1879.

*To all whom it may concern:*

Be it known that I, LOUIS BRAUER, of the city and county of Philadelphia, and State of Pennsylvania, have invented a new and useful Improvement in Extension-Chandeliers or Slide-Lights, which improvement is fully set forth in the following specification and accompanying drawing, in which the figure is a central vertical section of the portion of a chandelier or slide-light embodying my invention.

My invention relates to improvements in extension-chandeliers or slide-lights; and it consists of the sliding pipe, closely fitting the stationary pipe, and adapted to slide and be extended the entire length of said stationary pipe, in combination with soft packing occupying the entire space between the sliding pipe and a surrounding shell, the advantages whereof are hereinafter fully set forth.

It also consists of a washer interposed between the packing and adjusting screw collar or nut for preventing twisting of the packing.

Referring to the drawing, A and B represent the fixed and sliding pipes, respectively, of an extension-chandelier or slide-light. To the lower end of the pipe A is connected a shell, C, which forms a chamber or space around the sliding pipe, and with the end opposite to the connection with the pipe A engages a screw nut or collar, E, which thus also encircles the pipe B.

D represents soft packing, preferably of fibrous material, which is introduced into the shell C prior to application of the screw-collar E, and fills the entire space of said shell, the termination or shoulder *a* at one end of the inner face of the shell forming an abutment for said packing.

It will be noticed that the diameter of the pipe B is slightly less than that of the pipe A, and the upper end, *b*, of said pipe B provides a stop for preventing downward displacement of said pipe B.

The operation is as follows: The sliding pipe B is raised or lowered the proper extent relatively to the desired height of the burner or fixture attached to the pipe, the packing D, closing the joint in the shell C, producing friction against the pipe B, and in no wise interfering with the free movements of said pipe.

Should the friction of the packing be insufficient to sustain the sliding pipe and connected parts, the collar E is properly turned so as to compress the packing, the expansion whereof increases the friction on the pipe, the effect whereof is evident.

Should the friction of the packing be too great, the collar is properly turned so as to decrease the pressure on the packing, whereby the sliding pipe may be moved with greater freedom.

The packing may be readily replenished when reduced, and lubricated, if desired, and while adjustment of the compression is readily obtained by operation of the collar E, twisting and matting of the packing by rotation of the collar are prevented by means of a loose washer, F, of metal or other hard substance, interposed between the packing and collar.

I am aware that extension-chandeliers or drop-lights have been constructed of sections of pipe, one of which is provided with a packing chamber or shell and a compression-nut.

In one case the shell is occupied in part by packing formed of disks of woven material, necessitating the employment of springs to obtain the necessary friction. In other cases both springs and packing-disks are inclosed in the shells, either of which is insufficient to hold the sliding pipe; but in my invention the packing occupies the entire space between the shell and sliding pipe, and thus, forming a long frictional surface, furnishes solely for said sliding pipe the necessary friction under pressure of the screw-collar E.

Furthermore, the pipe B may slide and be extended the whole length of the pipe A, its motion being limited by contact of the stopping end *b* of the pipe A with the termination or shoulder *a* of the shell C, whereby the entire length of the pipe B is available for extension, and thus a shorter pipe than usual may be employed. Moreover, as by my construction springs are obviated, the pipes A B may be of small diameter, and the shell C made narrower than usual, and the consequent reduced joint between the parts affords less opportunity for escape of gas. Besides this, as the soft packing D, under action of the collar E, provides solely the necessary friction for the sliding pipe, the improvement will be found to be simple, inexpensive, durable, and practical.

Having thus described my invention, what I claim as new, and desire to secure by Letters Patent, is—

1. The extension-chandelier or slide-light having a sliding pipe, B, closely fitting the stationary pipe A, and adapted to be extended the entire length of said stationary pipe, in combination with soft packing D, occupying the entire space between the shell C and the sliding pipe, thus solely producing, under pressure of the screw-collar E, the necessary friction for said sliding pipe, substantially as and for the purpose set forth.

2. The pipes A B, shell C, and packing D, in combination with the screw-collar E and interposed washer F, substantially as and for the purpose set forth.

LOUIS BRAUER.

Witnesses:

JOHN A. WIEDERSHEIM,

W. F. KIRCHER.